United States Patent Office 3,300,521
Patented Jan. 24, 1967

3,300,521
7-METHYL-16-METHYLENE-Δ⁴-ESTRENE DERIVATIVES
Georg Anner and Peter Wieland, Basel, Switzerland, assignors to Ciba Corporation, New York, N.Y., a corporation of Delaware
No Drawing. Filed Sept. 1, 1964, Ser. No. 393,753
Claims priority, application Switzerland, Sept. 11, 1963, 11,223/63; June 9, 1964, 7,528/64
7 Claims. (Cl. 260—397.4)

The present invention provides a process for the preparation of new methylene-steroids of the Forumla I

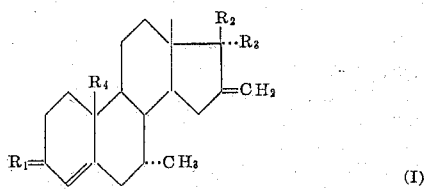

(I)

in which $R_1$ represents two hydrogen atoms or an oxo group, $R_2$ represents a free, esterified or etherified hydroxyl group, $R_3$ represents a hydrogen atom or a lower saturated or unsaturated aliphatic hydrocarbon radical and $R_4$ represents a hydrogen atom or a methyl group.

By esterified hydroxyl group is meant more especially an acid radical or an aliphatic, alicyclic, araliphatic or aromatic carboxylic acid containing at most 20 carbon atoms, for example, the acid radical of formic acid, methylcarbonic acid, acetic acid, trifluoroacetic acid, trimethylacetic acid, propionic acid, succinic acid, caproic acid, decanoic acid, undecenoic acid, hexahydrobenzoic acid, cyclopentylpropionic acid, phenylpropionic acid, benzoic acid and furane carboxylic acid.

By etherified hydroxyl group is meant more especially the tetrahydropyranyloxy group, a lower alkoxy, α-alkoxy-alkoxy, α-alkoxy-cycloalkoxy, α-alkenyloxy, α-cycloalkenyloxy or α-hydroxy- or -alkanoyloxy-β-halogen-alkoxy group, for example, a methoxy, ethoxy, propoxy, methoxy-methoxy, α-methoxy-ethoxy, 2-ethoxy-propoxy-(2), 2-methoxy-butoxy-(2), α-methoxy-cyclopentoxy, α-ethoxy-cyclohexyloxy, buten-(2)-yloxy-(2), α-cyclopentenyloxy, α-hydroxy-β-trichlorethoxy or α-acetoxy-β-trichlorethoxy group.

As lower saturated or unsaturated aliphatic hydrocarbon radicals there may be mentioned, for example, lower alkyl radicals such as methyl, ethyl, propyl and isopropyl radicals, lower alkenyl radicals such as vinyl, allyl and methallyl radicals, and lower alkinyl radicals such as ethinyl and propinyl radicals, and the corresponding halogenated radicals, for example, the trifluoromethylethinyl group. The term "lower" as used in connexion with hydrocarbon radicals both in the foregoing and hereinafter refers to radicals having not more than 7 carbon atoms in the chain.

The new 16-methylene-androstenes and -estrenes possess valuable pharmacological properties. In the test animal, they exhibit a high anabolic-androgen quotient, and, especially the 3-unsubstituted 17α-alkinyl compounds, also high gestagenic and antigonadotropic activity. They can therefor be used as anabolic agents, gestagens and ovulation inhibitors. They are also suitable for use as intermediate products in the preparation of medicaments.

Compounds that are specially valuable are those of the Formula I in which $R_1$ represents two hydrogen atoms or oxo, $R_2$ represents a free or esterified hydroxyl group, $R_3$ represents a lower alkyl, alkenyl or alkynyl group, and $R_4$ represents a hydrogen atom, for example, Δ⁴-7α:17α-dimethyl-16-methylene-17β - hydroxy-estrene and Δ⁴-17α-methyl-16 - methylene-17α - ethinyl - 17β-hydroxy-estrene their 3-oxo-derivatives and esters thereof.

The new compounds can be prepared by known methods. Advantageously, the procedure is such that
(a) In compounds of the Formula II

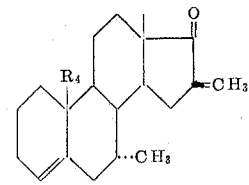

(II)

their 3-hydroxy derivatives of the ketals, enol esters, eno ethers, esters or ethers of the corresponding 3-oxo or 3-hydroxy compounds, the 17-oxo group is reduced to form a 17β-hydroxyl group, if necessary, with the simultaneous introduction of a lower saturated or unsaturated aliphatic hydrocarbon radical in 17α-position.
(b) In compounds of the Formula III

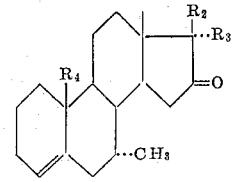

(III)

their 3-hydroxy derivatives or the ketals, enol esters, eno ethers, esters or ethers of the corresponding 3-oxo or 3-hydroxy compounds, the 16-oxo group is replaced by a methylene group, or
(c) Compounds of the Formula IV

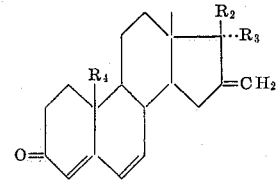

(IV)

are reacted with a methyl magnesium halide and the addition compounds obtained hydrolysed, 3-ketals, 3- eno esters 3 enol ethers 3-esters or 3-ethers that may be obtained are hydrolysed to form 3-oxo or 3-hydroxy compounds and the 3-hydroxy compounds obtained are dehydrogenated to the 3-ketones or in these compounds the substituent in position 3 is eliminated and, if desired 17β-hydroxy compounds that are obtained are esterifiec or etherified.

The reduction of the 17-oxo compounds can be effected, for example, either with a complex light-meta hydride, especially an alkali metal boron or aluminium hydride, for example, lithium or sodium boron hydride lithium aluminium hydride or lithium tri-tertiary-butoxy aluminium hydride, or by means of a metal derivative especially a Grignard compound or an alkali metal derivative such as a lithium or sodium derivative, of a lower saturated or unsaturated aliphatic hydrocarbon For the said reactions there are used the suitable solvents especially ethers such as diethyl ether, tetrahydrofurane dioxane, glycol dimethyl ether or polyglycol ether. The introduction of a lower alkinyl radical in 17α-position is also carried out, for example, in such a manner that a lower alkyne, for example, acetylene, dissolved, for example, in a lower alkanol such as ethanol, butanol or tertiary pentanol, or one of the aforementioned ethers especially glycol dimethyl ether, is allowed to act on the 17-oxo compound in the presence of an alcoholate, for example, a lower alkali metal alkanolate such as sodium ethylate or sodium tertiary amylate.

The conversion of the 16-oxo compounds into the desired 16-methylene compounds can be carried out, for example, according to Wittig's procedure by reaction with lower trialkylphosphonium-methylides or triarylphosphinium-methylides such as triphenylphosphonium-methylides, or by reaction with ketene in the presence of a Lewis acid such as boron trifluoride etherate, and decarboxylation of the resulting spirolactone.

The introduction of the methyl group into compounds of the formula IV is advantageously performed with methyl magnesium bromide or iodide in the presence of a catalyst, especially a copper salt, for example a halide or acetate, such as copper-I-chloride or copper-II-acetate. Solvents suitable for this reaction are especially ethers, for example one of the above mentioned ethers. The addition product obtained is hydrolysed in the known manner, for example by treatment with water or advantageously with aqueous ammonium salt solutions, e.g., ammonium chloride solutions.

When 3-ketals, 3-enol esters, 3-enol ethers, 3-esters or 3-ethers are obtained as reaction products they can be converted into the corresponding 3-ketones or 3-hydroxy-compounds by known methods, for example, by acidic or alkaline hydrolysis or, as the case may be, by hydrogenolysis; for example by means of dilute acetic acid, hydrochloric acid or perchloric acid, sodium or potassium hydroxide, carbonate, methylate, ethylate or borohydride.

3-hydroxy compounds that may be obtained are dehydrogenated to the corresponding 3-ketones by known methods, for example according to Oppenauer's method or by means of derivatives of hexavalent chromium, such as chromium trioxide or tertiary butyl chromate.

3-thioketals that may be obtained can be converted into compounds unsubstituted in position 3 in a manner in itself known, for example, by treatment with a nickel catalyst, for example, Raney nickel, in an organic solvent, for example, in one of the aforementioned alcohols or ethers, or with an alkali metal or alkaline earth metal such as lithium, sodium, potassium or calcium in liquid ammonia and/or a lower aliphatic amine, for example, diethylamine or ethylenediamine, if desired, in the presence of the last-mentioned ethers. 3-ketones that may be obtained can be converted into 3-thioketals by reaction with a lower aliphatic mercaptan or thioglycol such as methyl-, ethyl- or propyl-mercaptan or ethylene-, 1:2- or 1:3-propylene-dithiol and then split as indicated.

The $17\beta$-hydroxy group in the products of the invention can be esterified or etherified by known methods. The esterification is carried out, for example, by reacting the $17\beta$-hydroxy compounds with reactive functional derivatives of the acids mentioned above, especially their anhydrides or halides. In order to prepare the tetrahydropyranyl-ethers, dihydropyrane is allowed to act on the compounds in the presence of an acid catalyst such as para-toluene-sulphonic acid, phosphorous oxychloride or pyridine-hydrochloride. When the $17\beta$-hydroxy compounds are reacted with ketals or acetals, especially dimethyl ketals or diethyl ketals or dimethyl acetals or diethyl acetals of simple ketones, for example, acetone, methylethylketone, cyclopentanone or cyclohexanone, or aldehydes, for example, acetaldehyde or propionaldehyde, mixed acetals or ketals are obtained by transacetalization. When heated, these are converted into enol ethers with elimination of alcohol. When a 17-hydroxy compound is treated with chloral, a hemiacetal is formed whose free hydroxyl group can be esterified in known manner, for example, acetylated or propionylated.

The invention further includes any variant of the present process in which an intermediate obtainable at any stage of the process is used as starting material and any remaining steps are carried out or the process is discontinued at any stage thereof, or in which a starting material is formed under the reaction conditions or is used in the form of a salt.

The compounds used as starting materials can be prepared from the appropriate $\Delta^{4,6}$-3-oxo-17-hydroxy-androstadienes or $\Delta^{4,6}$-3-oxo-17-hydroxy-estradienes unsubstituted in positions 7 and 16 or the esters thereof. $\Delta^4$-3-oxo-7$\alpha$-methyl-17-hydroxy-androstenes or $\Delta^4$-3-oxo-7$\alpha$-methyl-17-hydroxy-estrenes are obtained by treatment with methylmagnesium iodide in the presence of cuprous chloride or cupric acetate and subsequent hydrolysis. These can be converted by known methods into the corresponding 3-ketals, for example, the above-mentioned thioketals or corresponding oxygen-containing ketals, enol esters or enol ethers, for example, enol esters of the above-mentioned carboxylic acids or enol ethers of lower aliphatic alcohols, and then oxidized to form the corresponding 17-ketones, for example, with compounds of hexavalent chromium such as chromium trioxide.

These can be converted into 17-hydroxy-16-ketones in known manner, for example, via the 17-enolacylates and their epoxides. If desired, the 17-hydroxy-16-ketones can be converted into 17$\alpha$-substituted compounds of the formula III after ketalization of the oxo groups present, oxidation of the 17-hydroxy group, introduction of a hydrocarbon radial in 17$\alpha$-position and, if desired or required, elimination of the substituent in position 3 at any step.

The compounds of the Formulas II and IV are obtained from the 17-keto compounds unsubstituted in position 16, for example, by the Mannich reaction, that is to say, by reaction of the keto compounds with formaldehyde or with a substance yielding formaldehyde, for example, paraformaldehyde, and a secondary amine, for example, a lower dialkylamine or alkylene-amine, for example, dimethylamine, diethylamine, pyrrolidine or piperidine or a salt thereof, for example, the hydrochloride. The resulting Mannich base or its salt, especially that of a Lewis acid, for example, the borontrifluoride complex thereof, can be split in known manner to form the desired 16-methylene compound either directly or according to Hoffmann by quaternation of the Mannich base and subsequent degradation of the quaternary ammonium group.

However, the introduction of a 16-methylene group into 17-ketone compounds unsubstituted in position 16 can also be carried out stepwise. In this process the 17-ketone can first be converted into the corresponding 16-hydroxymethylene compound by aldol condensation, for example, with a formic acid ester, especially a low formic acid alkylester such as formic acid ethyl ester. The 16-hydroxymethylene compound is then reacted with a secondary amine, for example, one of those mentioned above, the resulting secondary aminomethylene compound (enamine) is reduced, for example, with a complex aluminium hydride such as lithium aluminium hydride or lithium-tri-tertiary butoxy-aluminium hydride, advantageously in an ether such as diethyl ether or tetrahydrofuran, to form the above-mentioned Mannich base, which can then be converted into the desired 16-methylene compound in the manner described.

The introduction of the methylene group into the 16-position can also be achieved by oxalic ester condensation with 17-ketones and treatment of the condensation product with formaldehyde under basic conditions.

It is advantageous to use those starting materials that yield the final products that are described above as being specially valuable.

The new methylene steroids can be used as medicaments, for example, in the form of pharmaceutical preparations containing the said compounds in admixture with an inorganic or organic, solid or liquid pharmaceutical excipient suitable for enteral or parenteral administration. Suitable excipients are substances that do not react with the new compounds, for example, water, gelatine, lactose, starch, stearyl alcohol, magnesium stearate, talc, vegetable oils, benzyl alcohols, gums, propylene glycol, polyalkylene glycols, cholesterol, and other known medicinal excipients. The pharmaceutical preparations may be, for example, tablets, dragees or capsules, or in liquid form solutions, suspensions or emulsions. They may be sterilized and/or contain assistants such as preserving, stabilizing, wetting or emulsifying agents, solution promoters, salts for regulating the osmotic pressure or buffers. They may also contain other therapeutically valuable substances. The pharmaceutical preparations are prepared by conventional methods and contain the new methylene steroids, for example, in an amount of 0.005–50% by weight or 0.5–50 milligrams per single dose, for example, per tablet or ampoule.

The new compounds can also be used in veterinary medicine, for example, in one of the above-mentioned forms or in the form of feedstuffs or feedstuff additives; the usual extenders, diluents or feedstuffs are used.

The following examples illustrate the invention without, however, limiting it.

*Example 1*

A mixture comprising 18 grams of methyl iodide in 20 millilitres of ether, is added dropwise, while stirring to 1.5 grams of lithium in 50 millilitres of ether in a stream of nitrogen. When the reaction is finished, the reaction solution is forced with nitrogen through a spun glass filter into a flask filled with nitrogen while washing with 50 millilitres of ether. To the solution of methyl-lithium thus freed from unreacted lithium are then added 2.9 grams of $\Delta^4$-7α-methyl-16-methylene-17-oxo-estrene in a nitrogen stream, while stirring, and with subsequent washing with 25 millilitres of ether. 16 hours later, an ice-methanol mixture with 7.5 millilitres of saturated sodium sulphate solution containing 0.75 millilitre of 0.1 N-sodium-thiosulphate solution is added to the reaction mixture while cooling. After the addition of water and extracting three times with benzene the organic solutions are washed four times with water, dried, and then evaporated in vacuo. The residue is chromatographed on 90 grams of alumina (activity II), whereby the $\Delta^4$-7α:17α-dimethyl-16-methylene-17β-hydroxy-estrene that is formed is eluted with 1:9 and 1:4 benzene-petroleum ether mixtures. 1.77 grams thereof melting at 122 to 123.5° C. are obtained therefrom by recrystallization from a mixture of methylene chloride and ether. 190 milligrams of the same compound can be obtained by concentrating the mother liquor. Optical rotation $[\alpha]_D^{20} = -57°$ (c.=1.048 in chloroform). IR spectrum bands (methylene chloride) at 2.77μ (hydroxyl) and 6.04μ (double bonds).

The starting material used can be prepared as follows:

A mixture comprising 5 grams of $\Delta^4$-7α-methyl-17-oxo-estrene, 3 grams of paraformaldehyde, 10 grams of dimethylamine hydrochloride and 50 millilitres of isoamyl alcohol is boiled for 2 hours in a stream of nitrogen at an oil bath temperature of 150° C. The reaction mixture is then allowed to stand in a freezing mixture for 3½ hours, 30 millilitres of N-hydrochloric acid are added, and the mixture is then suction-filtered through a glass frit while washing with water, cold isoamylalcohol and water. The filter residue is dissolved in methylene chloride, the methylene chloride solution is dried with sodium sulphate and then evaporated in vacuo. By recrystallizing the residue from a mixture comprising methylene chloride, ether and pentane, 1.21 grams of $\Delta^4$-7α-methyl-16-methylene-17-oxo-estrene melting at 149.5 to 154.5° C. are obtained. Further recrystallization from the same solvent mixture raises the melting point to 150 to 155.5° C. UV extinction in rectified spirit: $\epsilon_{227\ m\mu} = 9250$. IR spectrum bands (methylene chloride) at 5.79μ (16-ketone) and 6.19μ (conjugated double bond).

The filtrate obtained above is extracted with ether three times whereupon the ethereal solutions are washed with 0.1 N-hydrochloric acid and water, dried, evaporated in vacuo, and the residue is combined with the mother liquor of the 1.21 grams of the $\Delta^4$-7α-methyl-16-methylene-17-oxo-estrene obtained above (residue A). The aqueous phases are combined, sodium carbonate is added until an alkaline reaction is obtained, and then extracted three times with ether. The organic solutions are washed with water, dried, and evaporated in vacuo, and the residue, which comprises crude $\Delta^4$-7α-methyl-16-dimethylamino-methyl-17-oxo-estrene, is dissolved in 15 millilitres of pyridine and 15 millilitres of acetic anhydride, and the solution is then heated for 2 hours at 100° C. The reaction mixture is then evaporated in vacuo and the residue is filtered in a benzene solution through 50 grams of aluminium oxide (activity II) while washing with 700 millilitres of benzene. The filtrate obtained after evaporation is recrystallized from a mixture comprising methylene chloride, ether and pentane with the use of Carboraffin and there are obtained a further 865 milligrams of $\Delta^4$-7α-methyl-16 - methylene - 17-oxo-estrene. The mother liquor is combined with the residue A obtained above and the mixture is chromatographed on 90 grams of alumina (activity II). The fractions obtained from 1:9, 1:4 and 1:1 mixtures of benzene and petroleum ether are recrystallized from a mixture comprising methylene chloride, ether and pentane and there are obtained a further 895 milligrams of $\Delta^4$-7α-methyl-16-methylene-17-oxo-estrene. The total yield is thus 2.97 grams.

*Example 2*

A mixture comprising 3.1 grams of $\Delta^4$-7α-methyl-16-methylene-17-oxo-estrene, 20 millilitres of toluene and 280 millilitres of ether is saturated with acetylene gas at 0° C. 60 millilitres of a 1.8 N solution of sodium-t-amylate in tertiary-amylalcohol-toluene (1:3.42) are added dropwise at a temperature between —10 and 0° C. in the course of 20 minutes, and then acetylene gas is conducted through at 0 to 3° C. for 15 hours. The reaction mixture is then poured into 400 millilitres of ammonium chloride solution of 20% strength at a temperature of 5° C. After a good shaking, the aqueous layer is separated, extracted with ether and the organic solutions are washed with ice-cold ammonium chloride solution. The organic solutions are evaporated in a waterjet vacuum, the residue is dried and then chromatographed on 100 grams of alumina (activity II) whereby $\Delta^4$-7α-methyl - 16-methylene - 17α-ethinyl - 17β-hydroxy-estrene is obtained; M.P. 75–78°, optical rotation $[\alpha]_D = +4°$ (c.=0.969 in chloroform).

*Example 3*

A mixture of 25 grams of methyl iodide and 20 ml. of ether is allowed to flow slowly, with stirring, into a suspension of 2 grams of lithium in 50 ml. of ether. To remove any uncomsumed lithium the resulting mixture is pressed with nitrogen through a glass wool filter into a second flask and rinsed twice with 25 ml. of ether each time. The resulting methyl lithium solution is treated with stirring in a current of nitrogen with 2.28 grams of $\Delta^5$-3β-acetoxy-7α-methyl - 16-methylene-17-oxo-estrene and rinsed with 25 ml. of ether. After 16 hours, the reaction mixture, while being cooled with a mixture of ice and methanol, is treated slowly with 10 ml. of saturated sodium sulphate solution, extracted twice with benzene, washed with water, dried and the extract evaporated in vacuo.

The resulting crude $\Delta^5$-3β:17β-dihydroxy - 7α:17α-dimethyl-16-methylene-estrene is dissolved in 180 ml. of toluene and 36 ml. of cyclohexanone; 36 ml. of the solvent are then distilled off, the concentrate treated with a solution of 1.8 grams of aluminium isopropylate in 36 ml. of toluene, and the batch boiled for two hours in a current of nitrogen. The reaction mixture is then poured on to a dilute Rochelle salt solution and extracted with ether. The extract is washed with dilute Rochelle salt solution and water, dried and evaporated in vacuo; the residue is dried for a short time in a high vacuum at 90° C. to remove high-boiling constituents. The residue is chromatographed on 15 grams of alumina (activity II), the fractions eluted with benzene and recrystallized from a mixture of methylene chloride and ether, to yield 1.36 grams of $\Delta^4$-3-oxo-7$\alpha$:17$\alpha$-dimethyl-17$\beta$-hydroxy-16-methylene-estrene which, after further purification, melts at 199.5–200.5° C. Optical rotation: $[\alpha]_D^{20} = -42°$ (c.=0.483 in chloroform).

$$\epsilon_{242\ m\mu} = 18100$$

Infrared spectrum bands (methylene chloride) at 2.78, 6.00 and 6.18$\mu$.

The starting material may be prepared as follows:

A solution of 15 grams of $\Delta^4$-3-oxo-7$\alpha$-methyl-17$\beta$-acetoxy-estrene in 150 ml. of isopropenyl acetate and 0.15 ml. of sulphuric acid is boiled for one hour; 16 ml. of solvent are then distilled off and the batch again boiled for one hour. The reaction mixture is then treated with 1.5 grams of sodium acetate, evaporated in vacuo, the residue taken up in methylene chloride, the solution washed with water, dried and evaporated in vacuo. To the suspension of the resulting crude enol acetate in 1 litre of alcohol of 95% strength a solution of 6.75 grams of sodium boron hydride in 135 ml. of alcohol of 70% strength is added with stirring. After two hours and twenty minutes, the mixture is slowly treated with 12 ml. of glacial acetic acid while being cooled with ice, highly concentrated in vacuo, diluted with water and extracted with methylene chloride. The organic solutions are washed with water, dried and evaporated in vacuo and the residue is chromatographed on 750 grams of alumina (activity II). The crystalline fractions eluted with benzene are recrystallized from a mixture of ether and pentane to yield 7.56 grams of $\Delta^5$-3$\beta$-hydroxy-7$\alpha$-methyl-17$\beta$-acetoxy-estrene. The compound shows different melting points. The highest is at 134.5–136° C. Optical rotation: $[\alpha]_D^{20} = -69°$ (c.=0.558 in chloroform). Infrared spectrum bands (methylene chloride) at 2.77, 2.79 and 8.09$\mu$.

The fractions obtained with a mixture of benzene and ethyl acetate (1:1) are recrystallized from a mixture of methylene chloride and ether to yield 400 mg. of $\Delta^5$-3$\beta$-17$\beta$-dihydroxy-7$\alpha$-methyl-estrene which, after being recrystallized, melts at 199.5–202.5° C. Infrared spectrum bands (Nujol) at 3.05$\mu$.

0.025 ml. of phosphorus oxychloride is added to a solution of 1.2 grams of the resulting $\Delta^5$-3$\beta$-hydroxy-7$\alpha$-methyl-17$\beta$-acetoxy-estrene in 6 ml. of tetrahydrofuran and 6 ml. of dihydropyrane, with stirring, and the batch is allowed to stand for one and three-quarter hours at room temperature. After the addition of 100 ml. of sodium bicarbonate solution of 2% strength and extraction with methylene chloride, the organic solutions are washed with water, dried and evaporated in vacuo. To remove the last traces of dihydropyrane, the residue is dissolved in benzene and the solution again evaporated in vacuo. Crystallization from a mixture of ether and pentane, and from methanol, yields a total of 1.22 grams of the tetrahydropyranyl ether of $\Delta^5$-3$\beta$-hydroxy-7$\alpha$-methyl-17$\beta$-acetoxy-estrene as a mixture of stereoisomers.

The mixture of 1 gram of the so-obtained tetrahydropyranyl ether and 50 ml. of a 5% solution of potassium hydroxide in methanol is stirred overnight at room temperature and then heated for one hour at 60° C. 2.4 ml. of glacial acetic acid are then added, the reaction mixture evaporated in vacuo and, after the addition of water, extracted several times with methylene chloride. The residue of the organic solutions, which have been dried and evaporated in vacuo, is the crude 3-tretrahydropyranyl ether of $\Delta^5$-3$\beta$:17$\beta$-dihydroxy-7$\alpha$-methyl-estrene, and is added together with 10 ml. of pyridine, while being stirred and cooled with ice, to a mixture of 1 gram of chromium trioxide and 10 ml. of pyridine. After being stirred for 21 hours at room temperature, the reaction mixture is diluted with water and extracted several times with benzene. The extract is washed with water, dried and evaporated in vacuo, and the residue, in a benzene solution, is filtered through 3 grams of alumina (activity II) while being rinsed with 500 ml. of benzene. The evaporation residue of the filtrate is recrystallized from a mixture of methylene chloride, ether and pentane to yield 730 mg. of tetrahydropyranyl ether of $\Delta^5$-3$\beta$-hydroxy-7$\alpha$-methyl-17-oxo-estrene melting at 151.5–153.5° C. Infrared spectrum bands (methylene chloride) at 5.76$\mu$.

A mixture of 4.28 grams of the so-obtained tetrahydropyranyl ether and 60 ml. of acetic acid of 90% strength is placed in a bath of 100° C., then evaporated in vacuo, the residue dissolved in xylene, the solution again evaporated in vacuo, and this operation is repeated once. The residue is filtered in a benzene solution through 18 grams of alumina (activity II) while being rinsed with 2 litres of benzene. The evaporation residue of the filtrate is recrystallized from a mixture of ether and pentane to yield 2.8 grams of $\Delta^5$-3$\beta$-hydroxy-7$\alpha$-methyl-17-oxo-estrene melting at 140.5–142.5° C. Optical rotation: $[\alpha]_D^{20} = -3°$ (c.=0.604 in chloroform). Infrared spectrum bands (methylene chloride) at 2.77, 2.89 and 5.76$\mu$.

A mixture of 3 grams of $\Delta^5$-3$\beta$-hydroxy-7$\alpha$-methyl-17-oxo-estrene, 1.8 grams of formaldehyde, 30 ml. of isoamyl alcohol and 6 grams of dimethylamine hydrochloride is boiled for 2 hours in a current of nitrogen; the reaction mixture is then cooled, diluted with water and extracted with ether. The extract is washed with water, dried and evaporated in vacuo, and the residue is heated with 40 ml. of pyridine and 40 ml. of acetic anhydride for two hours at 100° C. in a current of nitrogen. The mixture is evaporated in vacuo, the residue dissolved in xylene, the solution evaporated in vacuo and the whole operation is repeated once. The residue is chromatographed on 90 grams of alumina (activity II), and the fractions, eluted with a mixture of benzene and petroleum ether (1:4), are recrystallized from a mixture of ether and pentane to yield 2.25 grams of $\Delta^5$-3$\beta$-acetoxy-7$\alpha$-methyl-16-methylene-17-oxo-estrene. Infrared spectrum bands methylene chloride at 5.79, 6.10 and 8.10$\mu$.

*Example 4*

To a methyl magnesium bromide solution, prepared by introducing methyl bromide into a mixture of 9 grams of magnesium and 120 ml. of ether, there are added, with stirring and cooling with a mixture of ice and methanol, first 270 ml. of absolute tetrahydrofuran and, then slowly and with further cooling, a solution of 3.36 grams of $\Delta^{4,6}$-3-oxo-16-methylene-17$\alpha$-ethinyl - 17$\beta$-hydroxyestradiene and 240 mg. of cupper acetate in 125 ml. of tetrahydrofuran while rinsing with 65 ml. of tetrahydrofuran. The reaction mixture is stirred for 2½ hours in a current of nitrogen at room temperature, 220 ml. of saturated ammonium chloride solution are added dropwise while cooling thoroughly and then 110 ml. of water. The batch is then extracted twice with benzene, the extract washed with saturated ammonium chloride solution, dried and evaporated in vacuo. The residue is chromatographed on 100 grams of alumina (activity II) and the crystalline fractions, eluted with benzene and benzene+ethyl acetate (19:1), are recrystallized from methylene chloride+ether +petroleum ether to yield 990 mg. of $\Delta^4$-3-oxo-7$\alpha$-methyl-16-methylene-17$\alpha$-ethyinyl-17$\beta$-hydroxy-estrene which, after further recrystallization, melts at 191–196.5° C. Optical rotation: $[\alpha]_D^{20} = +1°$ (c.=0.536 in chloroform). $\epsilon_{242\ m\mu} = 16450$. Infrared spectrum bands (methylene chloride) at 2.78, 3.02, 6.00 and 6.18$\mu$.

The starting material may be prepared as follows:

A solution of 35.34 grams of $\Delta^{3,5}$-3-ethoxy-17-oxo-estradiene and 177 grams of oxalic acid dimethyl ester in 290 ml. of benzene is added with stirring to a mixture of 43 grams of 50% sodium hydride in oil and 180 ml. of benzene in a current of nitrogen, the batch being rinsed with a total of 140 ml. of benzene. The reaction solution is stirred for 44 hours at a bath temperature of 30° C. and then slowly treated with a mixture of 57.6 ml. of glacial acetic acid and 325 ml. of ether while being cooled with ice. An hour later, 360 ml. of water are added, the batch is extracted with benzene and the organic solution washed with water. The benzene solution is dried and evaporated in vacuo, the residue freed in a high vacuum from excess oxalic acid dimethyl ester first, at a bath temperature of 30° C., and then at a temperature of 60° C. The resulting crude crystalline condensation product is dissolved in 1.4 litres of methanol and the solution stirred for 30 minutes at room temperature after the addition of 462 ml. of formaldehyde solution of 37% strength.

In the course of 60 minutes a solution of 80.4 grams of potassium carbonate in 720 ml. of water is added dropwise. After a further 90 minutes the reaction mixture is extracted with methylene chloride, washed with water and evaporated in vacuo. The residue is dissolved in a mixture of benzene and petroleum ether (1:4) and filtered through 420 grams of alumina (activity II) while being rinsed with 4 litres of the same mixture. The filtrate is evaporated and ether and pentane are added to the residue, to yield 8.67 grams of $\Delta^{3,5}$-3-ethoxy-16-methylene-17-oxo-estradiene which has an unsharp melting point. $\epsilon_{239\ m\mu}=2600$. Infrared spectrum bands (methylene chloride) at 5.78, 6.07 and 6.14$\mu$.

20 grams of lithium acetylide ethylenediamine addition compound are added to a solution of 8.67 grams of the above obtained methylene compound in 43 ml. of toluene and 128 ml. of dimethyl sulphoxide with gentle cooling; the batch is stirred for two hours at room temperature in a current of nitrogen. 86 grams of ammonium chloride are added cautiously to the reaction mixture while cooling with a mixture of ice and methanol; water is then added and the batch extracted with benzene and methylene chloride. The organic phases are washed with water, dried, evaporated in vacuo, and the residue chromatographed on 255 grams of alumina (activity II). The crystalline fractions eluted with benzene are combined, evaporated and the residue treated with ether, to yield 5.58 grams of $\Delta^{3,5}$-3-ethoxy-16-methylene-17$\alpha$-ethinyl-17$\beta$-hydroxy-estradiene melting at 215-219.5° C.; the product is processed immediately.

3.36 grams of bromosuccinimide and 2.7 ml. of glacial acetic acid are added with stirring to a mixture of 5.2 grams of the so obtained ethinyl compound, 230 ml. of acetone and 2.3 grams of sodium acetate in 15 ml. of water at −10° C. The reaction mixture is stirred for 3 hours while being cooled with a mixture of ice and sodium chloride, and is then treated with a solution of 3.8 grams of potassium iodide in 75 ml. of water and then with a solution of 6.2 grams of sodium thiosulphate in 75 ml. of water. The batch is extracted three times with benzene, the extract washed with dilute sodium chloride solution, dried and evaporated in vacuo with the addition of 10 ml. of dimethylformamide at 40° C. bath temperature. The residue is dissolved in 160 ml. of dimethylformamide and treated, with stirring in a current of nitrogen, with 9.2 grams of lithium carbonate and 9.2 grams of lithium bromide while being rinsed with 30 ml. of dimethylformamide. The mixture is stirred for 14 hours at a bath temperature of 100° C., cooled, and then poured on to water and 20 ml. of glacial acetic acid, and extracted three times with methylene chloride. The organic solution is washed with water, dried, evaporated in vacuo and any remaining dimethylformamide distilled off in a high vacuum. The residue is filtered in a benzene solution through 50 grams of alumina (activity II) and rinsed with 1.5 litres of a mixture of benzene and ethyl acetate (9:1). The filtrate is evaporated and the residue recrystallized from a mixture of methylene chloride and ether to yield 3.36 grams of $\Delta^{4,6}$-3-oxo-16-methylene-17$\alpha$-ethinyl-17$\beta$-hydroxy-estradiene which after further recrystallization melts at 197.5–198.5° C. Optical rotation: $[\alpha]_D^{20}=-40°$ (c.=0.433 in chloroform). $\epsilon_{282\ m\mu}=27200$. Infrared spectrum bands (methylene chloride) at 2.80, 3.03, 6.04, 6.18 and 6.32$\mu$.

What is claimed is:
1. Methylene-steroids of the formula

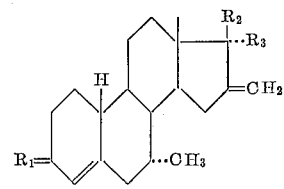

in which $R_1$ stands for a member selected from the group consisting of hydrogen and oxo, $R_2$ for a member selected from the group consisting of hydroxy, acyloxy of carboxylic acids with up to 20 carbon atoms, tetrahydropyranyloxy lower alkoxy, lower alkoxy-lower alkoxy, lower $\alpha$-alkoxy-cycloalkoxy in which cycloalkyl has 5 to 6 ring carbon atoms, lower $\alpha$-alkenyloxy, lower $\alpha$-cycloalkenyloxy in which cycloalkenyl has 5 to 6 ring carbon atoms, lower $\alpha$-hydroxy-$\beta$-halogenalkoxy, and lower alkanoyloxy-$\beta$-halogen-lower alkoxy and $R_3$ for a member selected from the group consisting of hydrogen and a lower aliphatic hydrocarbon radical.

2. Methylene-estrenes of the formula

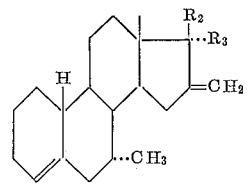

in which $R_2$ stands for a member selected from the group consisting of hydroxy and acyloxy of carboxylic acids with up to 20 carbon atoms and $R_3$ for a member selected from the group consisting of lower alkyl, lower alkenyl and lower alkynyl.

3. The 3-oxo-derivatives of the compounds claimed in claim 2.

4. $\Delta^4$-7$\alpha$,17$\alpha$-dimethyl-16-methylene - 17$\beta$ - hydroxy-estrene.

5. $\Delta^4$-7$\alpha$-methyl-16-methylene - 17$\alpha$ - ethinyl - 17$\beta$-hydroxy-estrene.

6. $\Delta^4$-3-oxo-7$\alpha$,17$\alpha$-dimethyl - 16 - methylene - 17$\beta$-hydroxy-estrene.

7. $\Delta^4$-3-oxo-7$\alpha$-methyl-16-methylene-17$\alpha$ - ethinyl - 17$\beta$-hydroxy-estrene.

References Cited by the Examiner
UNITED STATES PATENTS 3,117,060   1/1964   Bruckner et al. _____ 167—74

LEWIS GOTTS, Primary Examiner.

ELBERT L. ROBERTS, Assistant Examiner.